(No Model.)

M. GRISWOLD & S. SELDEN.
S. Selden, Dec'd.; E. P. Selden, Administrator.
WAFFLE IRON.

No. 270,659. Patented Jan. 16, 1883.

Witnesses
W. R. Edelen,
M. A. Edelen.

Inventors
M. Griswold, Inv.
E. P. Selden, Adr
For Samuel Selden, Dec'd
Per Hallock & Hallock
Att's ically high to allow the pans to be turned
UNITED STATES PATENT OFFICE.

MATTHEW GRISWOLD AND EDWARD P. SELDEN, OF ERIE, PA.; SAID EDWARD P. SELDEN ADMINISTRATOR OF SAMUEL SELDEN, DECEASED.

WAFFLE-IRON.

SPECIFICATION forming part of Letters Patent No. 270,659, dated January 16, 1883.

Application filed September 7, 1882. (No model.)

*To all whom it may concern:*

Be it known that MATTHEW GRISWOLD and SAMUEL SELDEN, (the latter now deceased,) citizens of the United States, and residents of Erie, in the county of Erie and State of Pennsylvania, did invent certain new and useful Improvements in Waffle-Irons, of which the following is a correct and full description, which will enable others skilled in the art to which said invention appertains to make and use the same.

This invention relates to the construction of waffle-irons; and it consists in parts and combination of parts, as hereinafter set forth.

Figure 1:
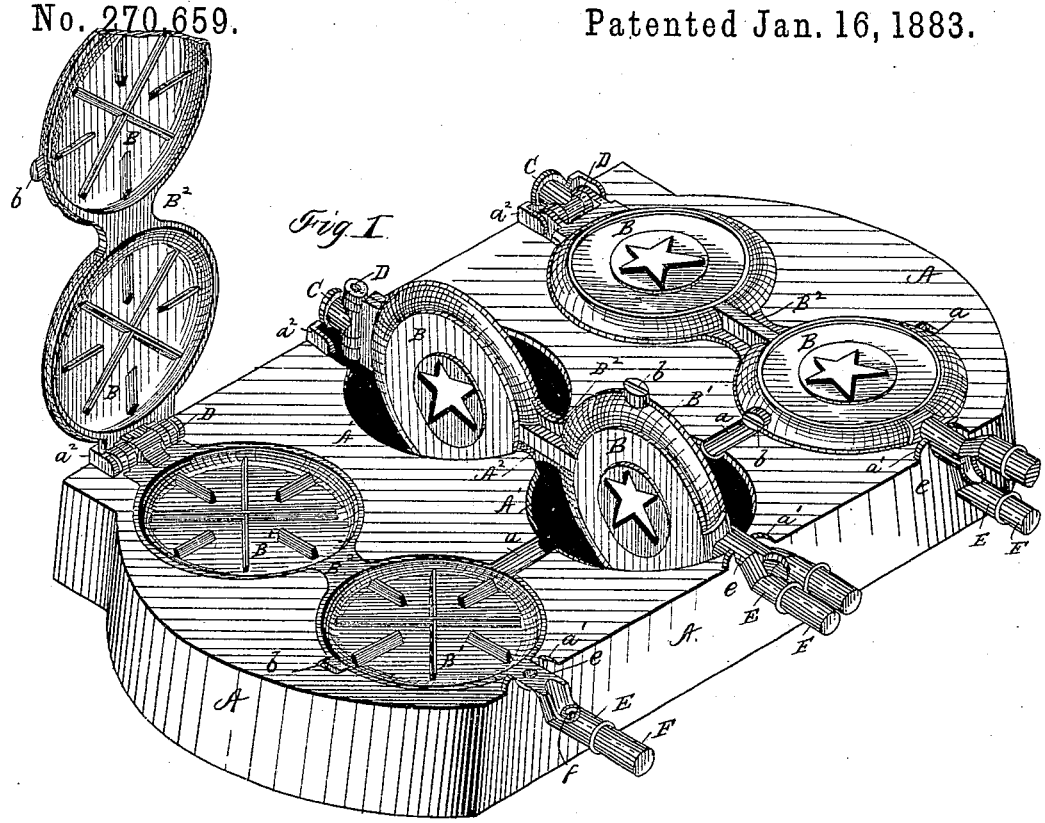
Figure 2:
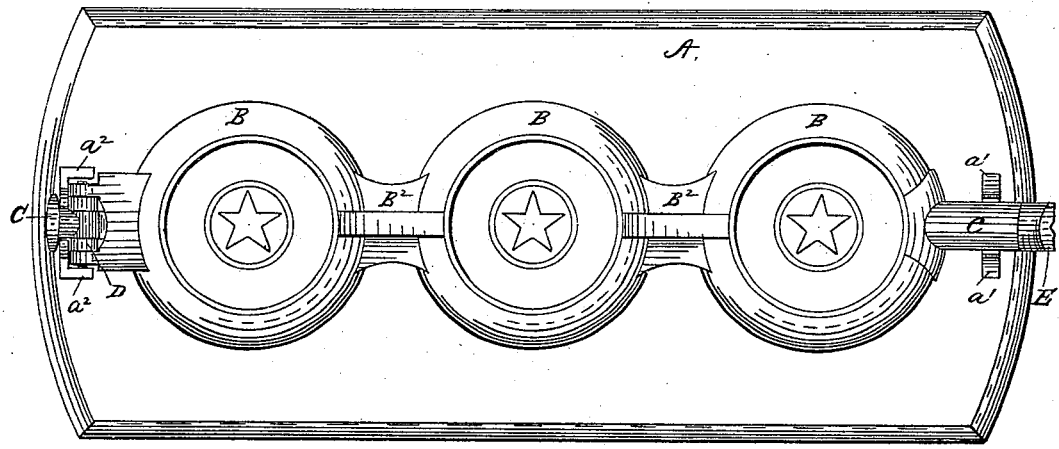

The device is shown in the accompanying drawings as follows:

Figure 1 is a perspective view of a waffle-iron containing a series of pans arranged in pairs. Fig. 2 is a top view, and shows a different arrangement of pans.

Letters of reference indicate parts as follows:

A is a supporting-frame for the pans. B B' are the pans, and $B^2$ is a connecting-web, by which two or more pans are connected together, so as to work on common pintles or journals, C e.

A' A' are the openings in the top of the frame A, in which the pans set, $A^2$ being an open space between each pair of openings A' A', in which the webs $B^2$ set.

E are sockets formed on the ends of the journals e, and F are wooden handles, set in the sockets E, by which the pans are turned and opened.

The manner of hinging the pans together, and of putting the journals on which they are turned on a line with the hinge, is all shown in a patent issued to the present inventors, dated June 29, 1880, No. 229,280, and therefore needs no explanation here; nor is such an arrangement of the hinge and its construction essential to the arrangement of two or more pans upon a common axis, or of two or more sets in one supporting-frame, which constitutes the essential feature of this construction.

The supporting-frame A is very like a pan inverted, and having openings A' A' communicating together at $A^2$ in its bottom, or, as it is inverted, its top. This frame sets upon the top of the stove over the griddle-holes, covering one or two, according to its size, the size shown in the drawings covering two. It is sufficiently high to allow the pans to be turned on their axis, whether the griddles are over the openings or not, so that the degree of heat can be regulated by removing or not removing the stove-griddles, as may be desired. The top of the frame A is provided with lugs a' $a^2$ for boxing the journals e and C, the lug $a^2$ being made to surround the hinge D, and also serve as a rest for the pan when raised, as seen at the left of Fig. 1.

The pans B and B' are cast in sets of two or more, joined together by the web $B^2$. In Fig. 2 there is shown a set of three pans on one common axis, and having only one hinge, D. By the use of this device three waffles can be baked at once. In Fig. 1 there are shown three sets of pans of two each. By this latter device six waffles can be baked at once, or the work can be carried on rotatively, thus: The pair on the right of the figure, we will suppose, have just been filled with batter, the middle one is ready to turn, and the one on the left is ready to fill. As soon as the latter are filled, the one on the right will be ready to turn, and the one in the middle will be ready to open and empty. Of course it will be obvious that two or more single pans, each having an independent axis, may be used and obtain the rotative operation, and also that only two pairs of pans can be used in one frame, if desired, and still preserve the rotative operation, and that sets of two, three, or more, can be put on a common axis and obtain rapidity in operation over the old way of a single pan.

In arranging pans in pairs or in sets, they should be connected together by webs $B^2$; but they may have the hinges on the sides, as well as at the end of the set, as is shown, but the axis or journals should be at the ends of the set.

We are aware that waffle-irons have been provided with pivots, so that either side of the iron could be turned to the fire, and that gridirons have been provided with two or more plates connected together, but not adapted to be reversed in the same manner as a waffle-iron, and to these we make no claim.

What is claimed as new is as follows:

1. In a waffle-iron, a supporting-frame provided with two or more openings, A', in combination with two or more pans, B B, joined together, and pans B' B' joined together, and one hinged to one of the pans B, the pans B B' each having half-journals which alternately rest upon the edge of the frame, substantially as described.

2. In a waffle-iron, a supporting-frame provided with two or more openings connected together by spaces $A^2$, in combination with two or more pans, B B, joined together by means of webs $B^2$, and pans B' B', joined together by means of webs $B^2$, and one hinged to one of the pans B, and all having half-journals which alternately rest upon the edge of the frame A, substantially as described.

3. In a waffle-iron, a supporting-frame provided with two or more sets of connected or communicating pan-openings, A' A' $A^2$, in combination with two or more sets of connected pans journaled within said openings, as shown, whereby the said device is adapted to bake two or more batches of two or more waffles each in such rotative succession that one or more batches will be in process of baking while one set of pans is being emptied and refilled.

In testimony whereof we have hereunto set our hands this 15th day of August, 1882.

MATTHEW GRISWOLD.
EDWD. P. SELDEN,
*Administrator estate of Saml. Selden, deceased.*

Witnesses:
JNO. K. HALLOCK,
W. R. EDELEN.